United States Patent
England

(10) Patent No.: US 8,352,740 B2
(45) Date of Patent: Jan. 8, 2013

(54) SECURE EXECUTION ENVIRONMENT ON EXTERNAL DEVICE

(75) Inventor: Paul England, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 905 days.

(21) Appl. No.: 12/125,929

(22) Filed: May 23, 2008

(65) Prior Publication Data

US 2009/0292919 A1 Nov. 26, 2009

(51) Int. Cl.
 *G06F 21/00* (2006.01)
(52) U.S. Cl. ......................................... 713/170; 713/187
(58) Field of Classification Search .......... 713/168–172; 726/2–5, 9, 20, 26, 27, 29
See application file for complete search history.

(56) References Cited

U.S. PATENT DOCUMENTS

| | | | |
|---|---|---|---|
| 7,254,722 B2 | 8/2007 | Catherman et al. | |
| 2004/0039924 A1 | 2/2004 | Baldwin et al. | |
| 2004/0054901 A1* | 3/2004 | England et al. | 713/168 |
| 2005/0039016 A1 | 2/2005 | Aissi et al. | |
| 2005/0289343 A1 | 12/2005 | Tahan | |
| 2005/0289646 A1 | 12/2005 | Zimmer et al. | |
| 2006/0085844 A1* | 4/2006 | Buer et al. | 726/4 |
| 2007/0094719 A1 | 4/2007 | Scarlata | |
| 2007/0226514 A1 | 9/2007 | Maletsky | |
| 2008/0046898 A1 | 2/2008 | Molina et al. | |
| 2009/0006868 A1* | 1/2009 | Alkove et al. | 713/193 |

FOREIGN PATENT DOCUMENTS

WO 0054126 A1 9/2000

OTHER PUBLICATIONS

Wyseur, et al., "Re-Trust: Remote EnTrusting by RUn-time Software authentication", Information Society Technology, Sixth Framework Programme, Project No. FP6-021186, Oct. 2007, 10 Pages.
Bajikar, "Trusted Platform Module (TPM) based Security on Notebook PCs—White Paper", Mobile Platforms Group, Intel Corporation, Jun. 20, 2002, pp. 1-20.
Schmidt, "Trusted Computing: Introduction& Applications, Lecture 4: Authorisation, sealing and binding", Dated: 2007 (date not stated within document; referring page http://andreas.schmidt.novalyst.de/ states document is notes from lecture in summer 2007), pp. 1-31.
Stumpf, et al., "An Approach to a Trustworthy System Architecture Using Virtualization", Autonomic and Trusted Computing, 4th International Conference, ATC 2007, Hong Kong, China, Jul. 11-13, 2007, Proceedings. Lecture Notes in Computer Science 4610, pp. 191-202.

* cited by examiner

*Primary Examiner* — Gilberto Barron, Jr.
*Assistant Examiner* — Abdulhakim Nobahar

(57) ABSTRACT

A device, such as a smartcard, may be externally-connected to a host platform and may be used to enhance or extend security services provided by the host platform's Trusted Platform Module (TPM). The device and the platform exchange keys in order to facilitate reliable identification of the platform by the device and vice versa, and to support cryptographic tunneling. A proxy component on the host device tunnels information between the platform and the device, and also provides the device with access to the TPM's services such as sealing and attestation. The device can provide secure services to the platform, and may condition provision of these services on conditions such as confirming the platform's identity through the exchanged keys, or platform state measurements reported by the TPM.

7 Claims, 6 Drawing Sheets

SECURE EXECUTION ENVIRONMENT ON EXTERNAL DEVICE

BACKGROUND

A secure computing platform is equipped with a Trusted Platform Module (TPM). The TPM provides a physically-secure computing environment that exposes a limited number of functions to the platform. One such function is reliable attestation of the platform's execution state. Another function is cryptographic sealing, which protects data by encrypting it with a physically-secure key by and binding use of the encrypted data to a particular platform execution state. Software that runs on the platform can leverage these TPM functions to create a secure execution environment on the platform.

The fact that the TPM implements a limited number of functions helps to make the TPM secure. Since the TPM implements only a small number of functions, the behavior of the TPM can be well-understood, thereby reducing the chance that unexpected security vulnerabilities could be found and exploited. However, there are some functions that it would make sense to perform inside a physically-secure environment, but that the TPM does not provide. While the TPM's exposed functions can be leveraged to provide general security for an execution environment on the platform, operations that take place on the platform outside of the TPM do not enjoy the physical security that the TPM provides. Once code or data is on the platform outside of the TPM, that code or data is subject to certain kinds of software and hardware attacks that could not be mounted in a physically-secure execution environment. Theoretically, a TPM could be constructed that provides a general-purpose execution environment so that some arbitrary code or data could be executed within the TPM's physical security barrier. However, TPMs that provide such general-purpose execution environments have not been available.

Physically secure execution environments other than the TPM do exist. However, devices that implement these environments are not physically bound to the host platform in the way that the TPM is. The TPM's ability to provide reliable attestation of, and sealing to, the platform's execution state is based on the nature of the TPM's physical binding to the platform. In particular, the TPM—including the registers that store execution state measurement—are reset whenever the platform is reset, and the identity of software that is running on the platform (which forms the basis of the measurements that are taken) is recorded by platform firmware. Moreover, since the TPM has a permanent physical connection to the platform, when the platform communicates with the TPM there is no concern that the TPM is being impersonated by some other component. By contrast, non-TPM devices that implement physically-secure execution environments are detachable from the platform, so imposter attacks are a concern when communicating with these detachable devices. Additionally, the resetting of a detached device is not linked to the resetting of the host platform, so an external device cannot reliably measure platform state acquired since the host platform's last reset.

Thus, using an external device to implement TPM-like security for a platform presents certain challenges.

SUMMARY

A host platform may use services performed in a physically-secure execution environment provided by an external device, such as a smartcard. The host platform is equipped with a TPM that provides certain cryptographic sealing and platform state attestation functions, which can be used to protect the host platform from certain kinds of attacks. The external device performs operations on the platform's behalf within the device's physically secure environment. The external device leverages the TPM's sealing and attestation functions to prevent misuse of operations that the external device performs for the platform. For example, the device may condition performance of an operation on a particular platform state (as reported to the device by the TPM), and may thus seek attestation of the platform state before performing an operation or before providing the platform with the result of the operation.

A device proxy is a software component that runs on the platform, and that requests TPM services on behalf of the external device. The proxy uses a cryptographic tunnel to transfer data back and forth between the platform and the device. TPM functions may be used to guard the tunneling key against misuse on the platform, e.g., by using the TPM to seal the key, and by using attestation to guard against the key being used when the platform is in an unknown execution state. The device may communicate with the proxy to obtain TPM services. For example, the device may request to seal or unseal data using the TPM, or may request an attestation of platform state before providing data to the device. Software entities that execute on the platform may request secure services from the external device. The proxy may receive these requests, and may use the cryptographic tunnel to pass the request to the external device, and to pass any responsive data generated by the device back to the requesting entity.

Trust between the external device and the platform is established in an out-of-band key exchange process. In this process, a key held by the platform's TPM is provided to the external device under conditions of physical security and trustworthiness that do not rely on the unsecure communication channels through which the device and the platform are connected. For example, a trustworthy person may obtain the TPM's key from the TPM manufacturing process. When the external device is detached from the platform and placed in a physically secure room that is not subject to data snooping, that person may provide the TPM key as input to the external device. Additionally, the platform may create one or more keys that can be provided to the platform in the form of a certificate. A particular device and platform are then bound to each other by this secure exchange of keys. The platform can identify the device based on whether the device holds the TPM key, and the device can identify the platform based on whether the platform holds the key(s) contained in the certificate. The key(s) contained in the certificate may also be used as a basis to establish the cryptographic tunnel between the host-side device proxy and the device.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION ON THE DRAWINGS

DETAILED DESCRIPTION

Figure 1:
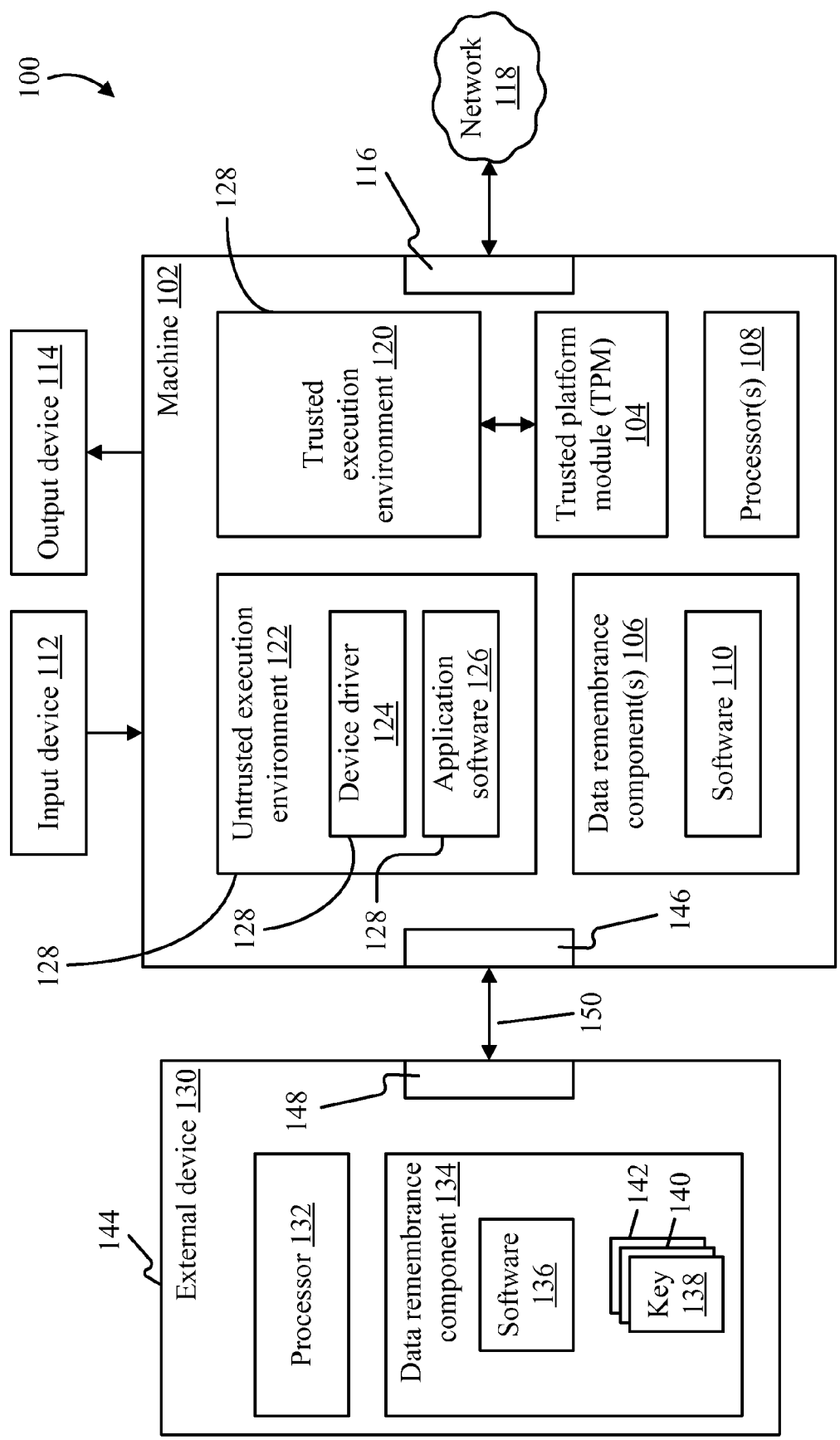
FIG. 1 is a block diagram of an example system in which a machine is equipped with a TPM and receives certain services from an external device.

Secure computing is often implemented with the aid of a Trusted Platform Module (TPM). A TPM is normally realized as a hardware component that is part of a computer's (or other machine's) hardware platform. The TPM exposes a small set of security-related functions that can be leveraged to create a secure execution environment on the platform. These functions typically include reliable attestation of the platform's execution state, and cryptographic functions that encrypt and decrypt data with a physically-protected platform-specific key. The theory behind these functions is that network and data security depends on the software that has access to the data. Attestation allows a remote server to authenticate remote software requesting a service before choosing to grant access or services. Sealing allows an operating system (OS) to secure data on persistent storage even when the OS is not running, because the OS can use the TPM facilities to ensure that cryptographic keys are only revealed back to it on next boot. Using the TPM's cryptographic and attestation functions, a platform's execution state can be verified, and secret data items (such as decryption keys) can be sealed to a particular platform's key and to a particular execution state. So, to the extent that the TPM is able to resist false attestation and divulgence of its keys, the TPM's functions can be leveraged to help software running on the platform resist various types of attacks.

The more complicated a system is, the more vulnerabilities it tends to have. Thus, part of the TPM's security lies in its simplicity. Since the TPM performs a relatively small set of functions, its behavior can be well-understood, thereby reducing the potential for attack. The downside to a small number of functions is that any security function that is not implemented directly by the TPM is normally implemented on the platform. In theory, a general-purpose secure execution environment to perform arbitrary security functions could be provided inside of the TPM, but TPMs that provide such an environment have not been available. Thus, security functions that are not implemented directly by the TPM can be implemented on the platform and can be made secure, to some degree, using various techniques to leverage the TPM's security. Examples of such techniques involve using the TPM to seal data and having the TPM attest to the platform's state at various times—thereby locking the data, and ongoing performance of a function, to a particular TPM and to a particular platform execution state. However, the security of software that runs on the platform is subject to various limitations, even when the TPM—s functions are leveraged to provide that security. The platform is a large, complicated system, which makes providing security on the platform inherently difficult. Moreover, the nature of the platform exposes data and operations to certain types of attacks that would not be possible in a physically secure environment—e.g., busses on the platform are relatively easy to probe. Thus, even though there is effectively a physical binding between the TPM and the platform, this binding has limits as to how much security it can provide for software and data on the platform.

The TPM and the platform are bound in various ways. For example, the TPM is reset whenever the platform is reset. One of the TPM's functions is to attest accurately to the execution state of the platform, where the state is measured based on the software that has been started on the platform since its last boot. The TPM maintains a record of this state in registers called Platform Configuration Registers (PCRs). When the TPM is reset along with the platform, the PCRs are zeroed, so that they reflect only execution state acquired since the reset, and not execution state that existed before the last reset. Additionally, the TPM can recognize different localities on the platform, and can grant different software different privileges based on the locality in which the software is running. When software on the platform issues an instruction to the TPM, the TPM can recognize the software's locality based on the memory region from which the instruction was issued. Because of the physical relationship between the TPM and the rest of the platform, the TPM can determine the originating memory region of an instruction in a way that cannot easily be spoofed. Resetting the TPM upon platform boot, recognizing localities, and using platform firmware to measure execution state are some examples of how the TPM uses its physical binding with the platform to implement security for the platform.

However, the binding between the TPM and the platform has some limitations. For example, in many TPM implementations, data that travels between the TPM and the rest of the platform travels over a bus that is not encrypted, and data that travels on this bus could be observed (with some effort). If the TPM is used to seal data with the TPM's physically-secure key, then the encrypted data is as secure as the TPM's key—as long as the data remains encrypted. However, once the TPM is asked to decrypt the data, the decrypted data is placed on the unencrypted bus, thereby exposing the data to observation. The existence of this type of physical vulnerability on the platform makes it difficult to implement an execution environment on the platform's processor that is as secure the environment inside the TPM.

There are physically-secure execution environments other than a TPM. For example, smartcards (e.g., Javacards, NET cards, etc.) and other devices provide various levels of physical security. For example, many smartcards have physical layers of resistance that protect against data observation. Some smartcards are not programmable, in the sense that they lose their code and data if one attempts to reprogram them. Thus a smartcard, like a TPM, can provide a physically secure execution environment within its boundaries.

However, unlike a TPM, a smartcard is not physically bound to a platform. A smartcard can be physically detached from one platform and attached to another. Data communicated between the platform and the smartcard travels on an unsecure bus, and the data transmission is facilitated by an unsecure device driver. The lack of security in this communication channel means that the smartcard cannot inherently rely on the integrity of the information that it receives from an attached platform, nor can the smartcard even trust the identity of the platform with which it is communicating. If the smartcard is unable to establish the integrity of data it receives from the platform, it cannot serve as a reliable measure of platform state (since the measurement would have to be based on data received from the platform). Moreover, if the smartcard cannot reliably establish the identity of the entity with which it is communicating, then there are security implications whenever the smartcard performs an operation and provides the resulting data to the platform, since the smartcard might be providing data to an imposter. Thus, in order to allow a smart card to perform security-sensitive services for a platform, mechanisms may be provided to allow the smart card and platform to identify each other reliably, and to allow the platform and smart card to communicate with each other in a protected way that does not subject the secrecy and integrity of their communications to the vulnerabilities of the platform. The subject matter herein provides such mechanisms. (The above description refers to a smart card providing services for a platform, although any kind of device could be used to provide these services.)

Turning now to the drawings, FIG. 1 shows an example system 100 in which a machine, equipped with a TPM, uses an external device such as a smartcard to obtain secure services. Machine 102 is a personal computer, server computer, handheld computer, set-top box, consumer device, or any other type of machine that is capable of executing instructions. Machine 102 is equipped with TPM 104. TPM 104 is typically a hardware component that is built into machine 102. TPM 104 is bound to machine 102 along the lines described above. For example, TPM 104 is reset when machine 102 is booted. Moreover, TPM 104 is able to measure the execution state of machine 102 using firmware on machine 102.

Machine 102 is also equipped with various features that are typical of computers and other electronic devices. For example, machine 102 is equipped with one or more data remembrance components 106 and one or more processor(s) 108. Data remembrance component(s) 106 are components that are capable of storing data for either the short or long term, such as hard disks, removable disks (including optical and magnetic disks), volatile and non-volatile random-access memory (RAM), read-only memory (ROM), flash memory, magnetic tape, etc. Processor(s) 108 are any type of processor, such as the microprocessors typically found in personal desktop or laptop computers, servers, handheld computers, or other kinds of computing devices. Data remembrance component(s) 106 may store software 110. Processor(s) 108 may be communicatively connected to data remembrance component(s) 106, and may execute the software 110 stored in the data remembrance components. Machine 102 may also have one or more input devices 112 (e.g., keyboard, pointing device, camera, etc.) through which input to be processed by machine 102 is received, and one or more output devices 114 (e.g., monitor, printer, speaker, etc.) through which machine 102 communicates information to the world outside of machine 102. Machine 102 may also have a network interface 116 through which machine 102 communicates with a network 118, such as the Internet, a local wired or wireless network, or any other type of network.

Machine 102 may provide various execution environments, which may offer various different levels of security and/or isolation. In the example of FIG. 1, machine 102 is shown as providing a trusted execution environment 120 and an untrusted execution environment 122. However, any number of execution environments, having any kinds of security properties, could be provided. Trusted execution environment 120 is typically provided using features of TPM 104, as well as other features of machine 102. Trusted execution environment 120 may have various security features that make it trustworthy, such as memory isolation, limitations on use of certain devices, or other security features. Software (such as a hypervisor) may implement these security features. For example, such software could implement memory isolation by controlling the contents of page tables that are used to translate virtual addresses, or could control the ability of a process in trusted execution environment 120 to communicate with device drivers. The software that implements these security features may leverage TPM's 104 functions to provide the security. For example, the software could make use of secrets, and could use TPM 104 to seal those secrets to a physically-protected key and to a particular execution state of machine 102. Or, the software may use TPM 104's attestation functions to obtain measurements of machine 102's execution state, and may take protective action in the event that machine 102 is found to be in an unknown state. The foregoing are merely examples of how a trusted execution environment could be implemented.

Untrusted execution environment 122 is an execution environment that provides less assurance of security than trusted execution environment 120. Various software components on machine 102 execute in untrusted execution environment 122—e.g., device driver 124, application software 126, or other types of software.

The various execution environments, and individual pieces of software that execute within an execution environment, may each be viewed as having a boundary 128. In the example of FIG. 1, trusted execution environment 120, untrusted execution environment 122, device driver 124, and application software 126, are each shown as having a boundary 128. The boundary may be implemented by various mechanisms, such as by giving each environment and/or process different memory maps, localities, or other features. The nature of the boundary is such that certain information can be used only within a particular boundary but not outside of it. The boundary that surrounds a particular piece of software might be the process boundary within which the software executes. However, the relevant boundary could be some other boundary, such as the boundary surrounding an execution environment (e.g., trusted execution environment 120), within which several different pieces of software could execute. As further discussed below in connection with FIG. 5, the subject matter described herein provides a piece of software in which a particular key is usable within that software's boundary but not outside of that boundary.

Machine 102 may be communicatively connected to an external device 130. External device 130 may be a smartcard, but could also be any other kind of device that is connectable to machine 102. External device 130 may have features such as processor 132 and data remembrance component 134. Data remembrance component 134 may store software 136, which may execute on processor 132. Data remembrance component 134 may also store one or more keys, such as keys 138, 140, and 142. (In the example of FIG. 1, three keys are shown as being stored in data remembrance component 134, although any number of keys could be stored. Additionally, while only external device 130 is shown in FIG. 1 as having keys, machine 102 and/or TPM 104 may also have keys as described below in connection with FIG. 2.) Data remembrance component 134 may be a non-volatile random access memory, which maintains data even when power is not applied to external device 130. Data remembrance component 134 may be in some way resistant to modification or snooping, which may help to prevent software 136 from being modified, and may also help to prevent keys 138, 140, and 142 from being divulged outside of external device 130. External device 130 may have a package 144, such as a plastic or metal casing, which surrounds its components.

Machine 102 and external device 130 may have communication interfaces 146 and 148, respectively, through which they may communicate with each other. Using these communication interfaces, machine 102 and external device 130 may be connected to each other, thereby forming a communication channel 150 between them. The communication interfaces through which this channel is formed may be any type of connection, such as a Universal Serial Bus (USB) connection, a Personal Computer Memory Card International Association (PCMCIA) connection, etc. Typically, communication channel 150 that is formed by this connection is not secure, in the sense that data sent over this channel is observable from various vantage points. Examples of such vantage points include an untrusted execution space (such as environment 122), or even from the world outside of machine 102 and external device 130.

Figure 2:
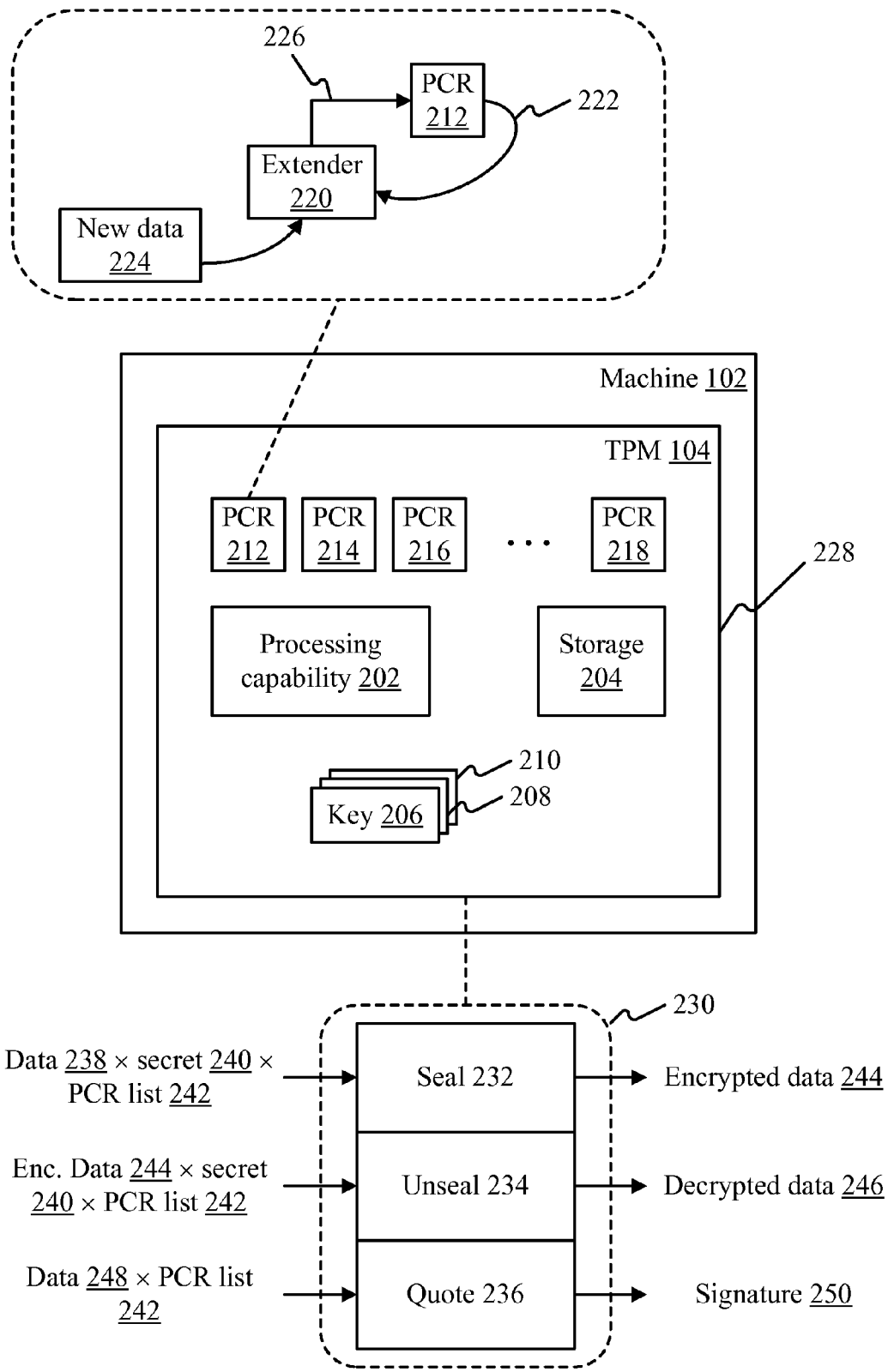
FIG. 2 is a block diagram of an example Trusted Platform Module (TPM).

FIG. 2 shows detail of an example TPM 104. TPM 104, as previously noted, is bound to (and is typically part of) machine 102. TPM 104 includes processing capability 202 and storage 204. Processing capability 202 may take the form of circuitry that implements a small instruction set. Storage 204 may be a small amount of volatile and/or non-volatile memory.

TPM 104 may maintain one or more keys 206, 208, and 210. (Three keys are shown in the example of FIG. 2, although any number of keys could be maintained.) Typically, keys 206 include an "endorsement key" (part of a key pair that TPM 104 uses to prove the identity of itself and/or the machine of which it is a part), and a "root storage key" which is used to encrypt some of the information stored in storage 204. As discussed below, TPM 104 may also learn of keys that are associated with a particular external device 130 (shown in FIG. 1). These keys may be stored in TPM 104 as well. Keys may be stored in storage 204.

TPM 104 may maintain one or more PCRs 212, 214, 216, and 218. PCRs are examples of elements that are used to store the execution state of machine 102. PCRs typically have the property that they are zeroed when machine 102 is booted, but that they are otherwise not settable to an arbitrarily-specified value. Rather, the values stored in PCRs are modifiable by "extension," whereby the next value to be acquired by a PCR is dependent on its current value. In FIG. 2, the value of PCR 212 is shown as being modifiable by extender 220. In order to change the value of PCR 212, extender 220 takes the current value 222 of PCR 212, and a piece of new data 224, and then sets the value of PCR 212 to a new value 226 that is based on both the current value 222 and the new data 224. For example, extender 220 could concatenate PCR 212's current value 222 with the new data 224, and generate a hash of this concatenation. The hash would then be new value 226. PCRs are typically used to store measurements of platform state. When software is started on a machine, TPM 104 may be called on to extend one or more of the PCRs with particular values. In this way, the PCRs may accurately reflect all of the software that has been started on machine 102 since its last boot: Whatever value a PCR stores is in some way reflective of all the data with which the PCR has been extended since the last boot, thereby establishing a chain of execution state that leads back to the boot.

TPM 104 may also have a barrier 228 that protects TPM 104 from the world outside of TPM 104. Barrier 228 may protect TPM 104 from observation by entities outside of TPM 104, and may protect the environment inside of TPM 104 from tampering.

TPM 104 may expose various functions 230, which may be used by software that operates on machine 102. Some examples of these functions are seal 232, unseal 234, and quote 236. Seal 232 and unseal 234 implement a form of encryption and decryption, and quote 236 implements machine-state attestation. Thus, seal 232 takes data 238, a secret 240, and a list 242 of PCRs as input, and produces encrypted data 244 as output. Encrypted data is based on all of the input, plus at least one of the keys held by TPM 104 (e.g., a root storage key), thereby causing encrypted data 244 to be sealed both to a particular machine 102 (as identified by the particular root storage key held by the machine's TPM), a particular execution state of the machine (as indicated by the PCR values), and an arbitrary secret. Unseal 234 takes encrypted data 244, secret 240, and list 242 of PCRs as input and produces decrypted data 246 as output. (Decryption is based on both the input to the unseal function and the TPM key that was used to seal the data.) If the correct secret 240 is provided, and if the values held in the PCRs in list 242 are the same as they were when seal 232 was used to create encrypted data 244, then decrypted data 246 would match the original input data 238. Quote 236 takes data 248 and a list 242 of PCRs as input, and creates a signature 250 of data 248 that is based on the current PCR values. Software on machine 102 can use quote to obtain signature 250 of data 248, and can then later call quote again in order to determine whether the execution state of machine 102 has changed. (Since the PCRs contain reliable measurements of execution state, a change in execution state will cause a subsequent call to quote 236 to produce a different signature of the same piece of data.) In this sense, quote 236 reports machine 102's state based on the values held in the PCRs.

Figure 3:
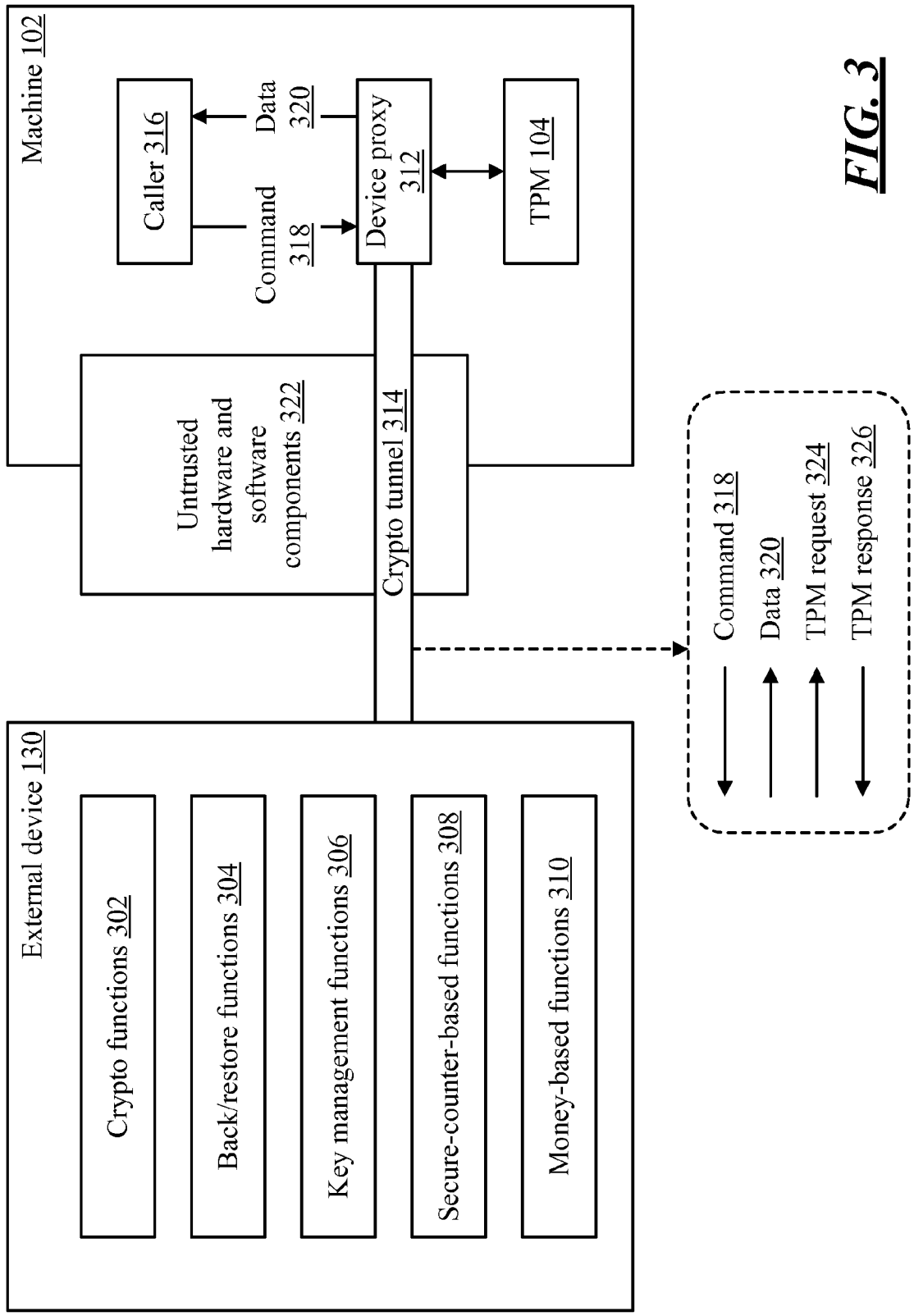
FIG. 3 is a block diagram of a scenario in which a machine uses an external device to perform various functions.

FIG. 3 shows an example scenario in which machine 102 uses an external device 130 to perform security-sensitive functions. External device 130 implements various functions that may have security implications. Some example functions that could be implemented by device 130 are shown in FIG. 3. These functions include cryptography functions 302 (such as versions of seal, unseal, and quote that provide different or enhanced functionality relative to their counterparts on the TPM); backup/restore functions 304; key management functions 306; secure counter-based functions 308 (in which limited use of some data or resource is protected by a rollback-resistant counter); and money-based functions 310. Functions 302-310 are merely examples, and it will be understood that any type of function could be implemented on external device 130. However, the security implications of example functions 302-310 are easy to appreciate. For example, one might want to implement different versions of seal/unseal/quote than are natively provided by the TPM, but without exposing these highly sensitive functions to an unsecure environment on machine 102. Similar considerations apply for the other functions mentioned. Mechanisms and techniques described herein may be used to allow the above-mentioned functions (or others) to be performed by external device 130, while maintaining levels of security similar to that provided by a TPM.

Device proxy 312 is a software component that executes on machine 102. Device proxy 312 implements a mechanism by which software on machine 102 can securely request and obtain service from external device 130, through which external device 130 can securely request service from TPM 104, and through which TPM 104 can securely provide service to an external device. Device proxy 312 implements a cryptographic tunnel 314 through which software on machine 102 can issue a command 318 to external device 130. External device 130 may perform an action in response to command 318, and this action may, optionally, involve sending responsive data 320 back to machine 102 through cryptographic tunnel 314. (Arrows next to items 318, 320, 324, and 326 in FIG. 3 indicate direction of data flow.) Device proxy 312 may use functionality of TPM 104 (e.g., the seal/unseal and attestation functions of TPM 104) to provide for device proxy 312's own security and to protect the integrity of its behavior (or, alternatively, device proxy 312 could be part of a hypervisor that uses TPM 104 to protect device proxy 312).

Caller 316 (which may be a software process on machine 102) may issue command 318 to be processed by external device 130. Command 318 might be a command to encrypt/decrypt some information using external device 130's version of seal/unseal. Or, command 318 could be a command to use money from an account that is stored electronically on external device 130, or to restore some backed-up data to which access is gated by external device 130. Any type of command 318 could be issued. External device 130 may carry out the command and provide responsive data 320, which device proxy 312 provides back to caller 316.

Physically, communications between machine 102 and external device 130 involve various forms of untrusted hardware and software components 322. Examples of these untrusted components include device drivers, unencrypted and observable busses, observable memory, processes with weakly-enforced isolation, etc. Thus, device proxy 312 tunnels command 318 and data 320 between external device 130 and machine 102 through cryptographic tunnel 314. Information that passes through cryptographic tunnel 314 may be encrypted using one or more keys that are learned in an out-of-band key exchange, which is more particularly described below in connection with FIG. 6. (Since binding and communication between external device 130 and machine 102 are insecure, it is difficult to establish trust and to perform a secure exchange of keys directly through the communicative connection between external device 130 and machine 102. Once cryptographic tunnel 314 is established, it can be used to exchange information securely. But establishing a tunnel in which secrecy, data integrity, and identity of the tunnel endpoints are assured depends on an initial key exchange having taken place before the tunnel is used, and that this exchange of keys takes place under circumstances that are sufficiently trustworthy to the stakeholders in the security of a system that uses the tunnel. Thus, the initial establishment of trust and key exchange is performed without using the normal communication connection between external device 130 and machine 102.)

As noted above, external device 130 may respond to command 318 by tunneling data to device proxy 312, which is to be provided back to caller 316. However, another example of information that external device 130 could tunnel to machine 102 is a request 324 to be executed by TPM 104. External device 130 may want to condition performance of certain functions on machine 102's being in a known execution state. However, for reasons noted above, external device 130 is not able to reliably measure machine 102's execution state due to external device 130's weak physical binding with machine 102. Thus, external device 130 might issue a request 324 (such as quote) to TPM 104 in order to obtain a measurement of platform state. (Similarly, request 324 might request use of other functions of TPM 104, such as seal and unseal.) If device proxy 312 receives such a request, then device proxy 312 passes the request to TPM 104. Device proxy 312 then tunnels TPM 104's response 326 to external device 130.

Figure 4:
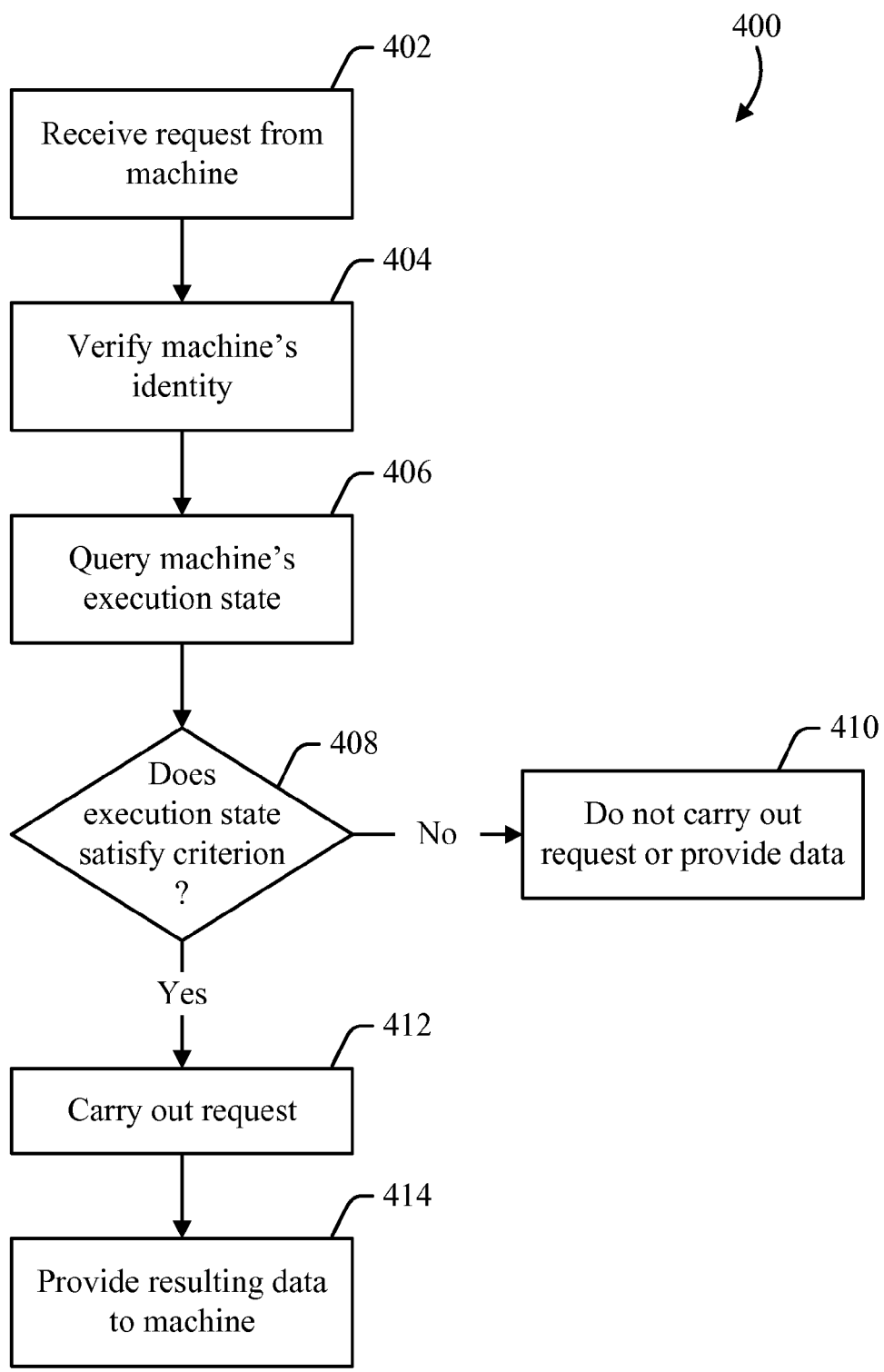
FIG. 4 is a flow diagram of an example process that may be carried out by a device in order to provide services for a host machine.

FIG. 4 shows an example process 400 that may be used by a device to provide services for a machine. For example, process 400 could be carried out by external device 130 to provide services for machine 102 (both shown in FIG. 1), although process 400 could be carried out by any device.

At 402, a request is received from a machine. For example, as discussed above in connection with FIG. 3, a caller on machine 102 may issue a command to be tunneled to external device 130, which will carry out the command. Such a command is an example of the kind of request that a device could receive at 402.

At 404, the device verifies the identity of the machine from which the request originated. This verification could take place each time a command is received from the machine, at the time the first command is received from the machine, or even earlier (such as the time at which communication between the device and machine is established). In general, the stages shown in FIG. 4 (as well as in the flow diagram of FIG. 5, discussed below) are not limited to the sequence shown. Verification of the machine's identity may involve the device's determining that the machine (or a component of the machine, such as the TPM) holds a particular key. This verification may be made through a challenge-response protocol, or through some other mechanism. Mechanisms are generally known by which one entity can verify that another entity holds a key. Typically, the key that the device verifies is a key that a component of the machine holds and uses on the machine, but that the component does not expose to execution environments outside of itself. For example, as discussed above, a TPM may hold an endorsement key that the TPM uses to prove its identity, but does not generally expose to the platform on which the TPM is installed. The endorsement key is thus an example of a key that may be verified at 404. The device that is verifying the key may have learned of this key in an out-of-band key exchange, as described below in connection with FIG. 6.

At 406, the device may query the machine's execution state. For example, the device may know of a particular "safe" execution state that could exist on the machine that it provides service for, and the device may be configured to carry out a request if the machine is in the known safe state, and not to carry out the request (and/or not to provide data generated by carrying out the request) if the machine is not in the known safe state. The device may query the machine's state by tunneling a quote request to the TPM. As discussed above in connection with FIG. 3, a device proxy 312 may receive such a request, provide it to the TPM, and provide the result back to the requesting device.

At 408, it is determined whether the execution state of the machine satisfies some criterion. For example, the device issuing the query may determine whether the machine's PCRs have specific values, or that the value in a particular PCR conforms to some set of acceptable values (which might represent several different acceptable machine execution states that the device would consider acceptable). If the machine's state does not meet the criterion, then (at 410) the request that was received at 402 is not carried out (or, perhaps, the request could be carried out but the resulting data would not be provided to the machine).

If it is determined at 408 that machine's execution state does meet the applicable criteria, then the request that was received at 402 is carried out (at 412), and the data that results from carrying out the request is provided to the machine (at 414).

Various different types of operations could be carried out at 412, resulting in various different types of data. For example, the request could be to use seal and unseal functions implemented on an external device, in which case the data that results from carrying out the request would be either ciphertext (in the case of seal) or cleartext (in the case of unseal). As another example, the external device might hold a key or other secret that could be used on the host machine, in which case the request may be to provide this secret, and the data provided at 414 could be the secret itself. One specific use of the key is as a sealing secret for use as input to a TPM's seal function. Thus, data on a host platform might be sealed by the TPM using a particular secret that is held by an external device, thus allowing the external device to control when data on the host machine is to be unsealed by determining when and whether to provide the key. A further variation on this scheme is to have the external device limit the use of the sealing secret, e.g., by incrementing a secure counter each time the secret is delivered to the platform, and checking that the number of times that the secret has been delivered to the platform has not exceeded a limit. The foregoing are some examples of requests that could be made to an external device, although any type of request could be made.

Figure 5:
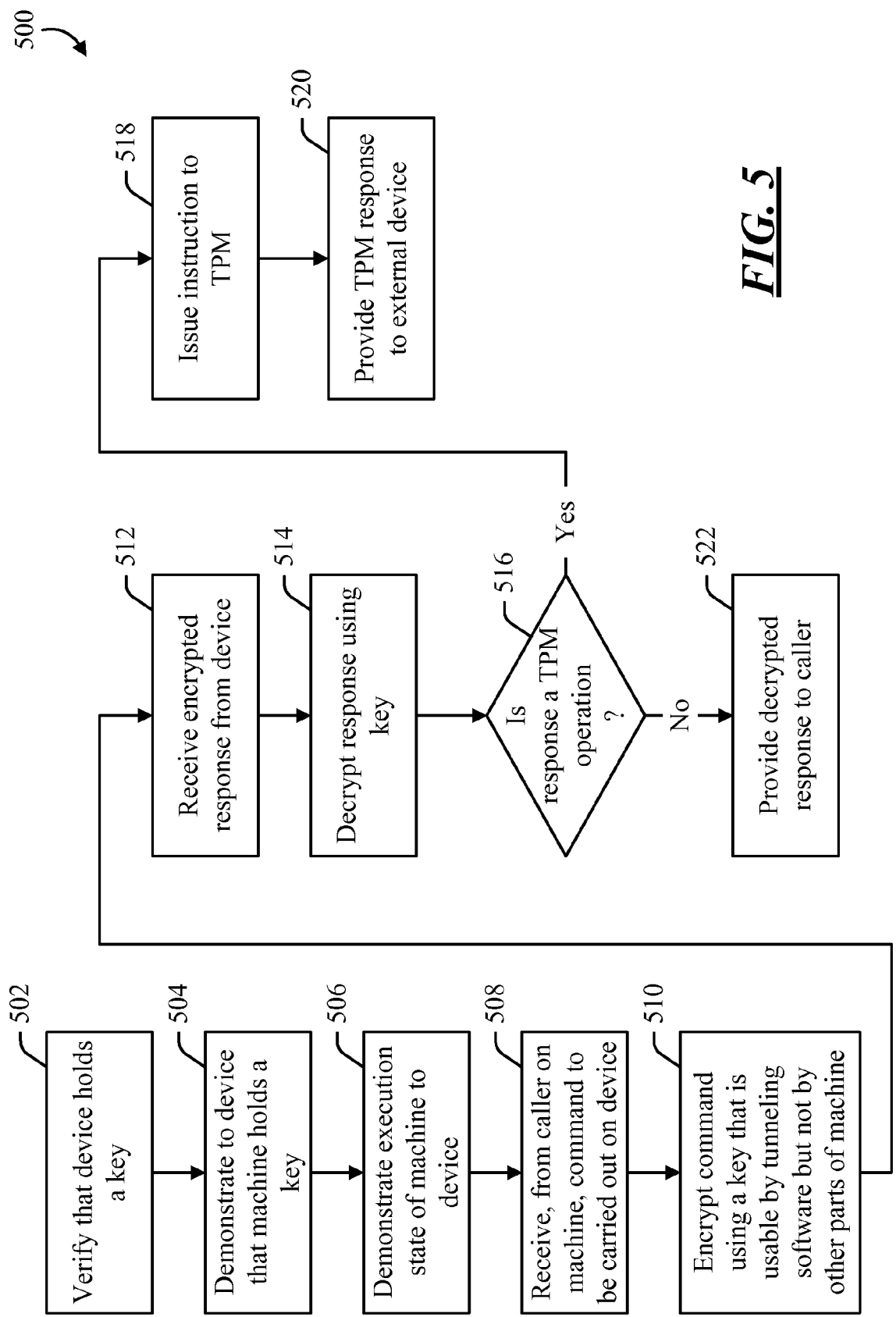
FIG. 5 is a flow diagram of an example process that may be carried out on a host machine in order to interact with an external device.

FIG. 5 shows an example process 500 that may be carried out on a TPM-equipped host machine in order to allow that machine to interact with an external device. For example, process 500 may be carried out by device proxy 312 (shown in FIG. 3), although process 500 could be carried out by any component.

At 502, the machine verifies that the external device it is communicating with holds a particular key. For example, the machine's TPM's endorsement key may have been provided to the external device in a key exchange process (as described below in connection with FIG. 5), and the machine may verify that the external device with which it is communicating holds this key (or some other key that might be derived from the key learned during the key exchange process). The verification could be made through a challenge-response protocol, or any other mechanism that provides protection against man-in-the-middle, snooping, or data modification attacks.

At 504, the machine may demonstrate to the external device that the machine holds a particular key. For example, during the key exchange process, the external device may generate a certificate containing one or more keys held by the external device, which the machine may receive as input. As part of establishing secure communications, the external device may request to verify that the machine holds this key, and the machine may make this demonstration at 504 (e.g., by responding to a challenge-response protocol).

At 506, the machine may demonstrate its execution state to the external device. For example, the external device may issue a quote request to be carried out by the TPM, and the machine may respond to this request by having the machine generate the quote and tunneling the response to the external device. (As previously noted, the various stages shown in the flow diagram do not have to be carried out in the sequence shown. Thus, the demonstration of key possession and/or execution state could be carried out at any time and in any sequence, and could be carried out more than once.)

At 508, a caller on the machine issues a command to be carried out on the external device, and this command may be received by the appropriate component (e.g., by device proxy 312, shown in FIG. 3). At 510, the command is encrypted. The encryption is performed using a key that is usable by the tunneling software (e.g., by device proxy 312) but not by components that are outside of a boundary that the tunneling software operates in (where the relevant boundary could be the boundary of the process in which the tunneling software operates, the boundary of an execution environment in that process exists, or some other boundary). Thus, the software that performs the tunneling can use the key, but—since the host machine may have various non-secure execution environments—the key is not usable on other parts of the host machine. The key may have been learned during an out-of-band key exchange process—as described below in connection with FIG. 6—or could be derived from a key that was learned in the key-exchange process. Platform execution state measurement and TPM sealing may be used to protect the key from disclosure on the platform outside of the relevant boundary. The encrypted command is tunneled to the external device (e.g., through cryptographic tunnel 314, shown in FIG. 3).

At 512, an encrypted response is received from the device (e.g., through the cryptographic tunnel). At 514, the response is decrypted. As noted above in connection with FIG. 3, information received at the machine from the external device could be the data that is responsive to a command, or could be a request to carry out an operation on the TPM. If the response received is a request to carry out an operation on the TPM (as determined at 516), then the appropriate instruction is issued to the TPM (at 518), and the TPM's response is tunneled to the external device (at 520). On the other hand, if it is determined (at 516) that the response received from the external device is not a request to carry out a TPM operation, then the decrypted response is provided to the original caller (at 522).

Figure 6:
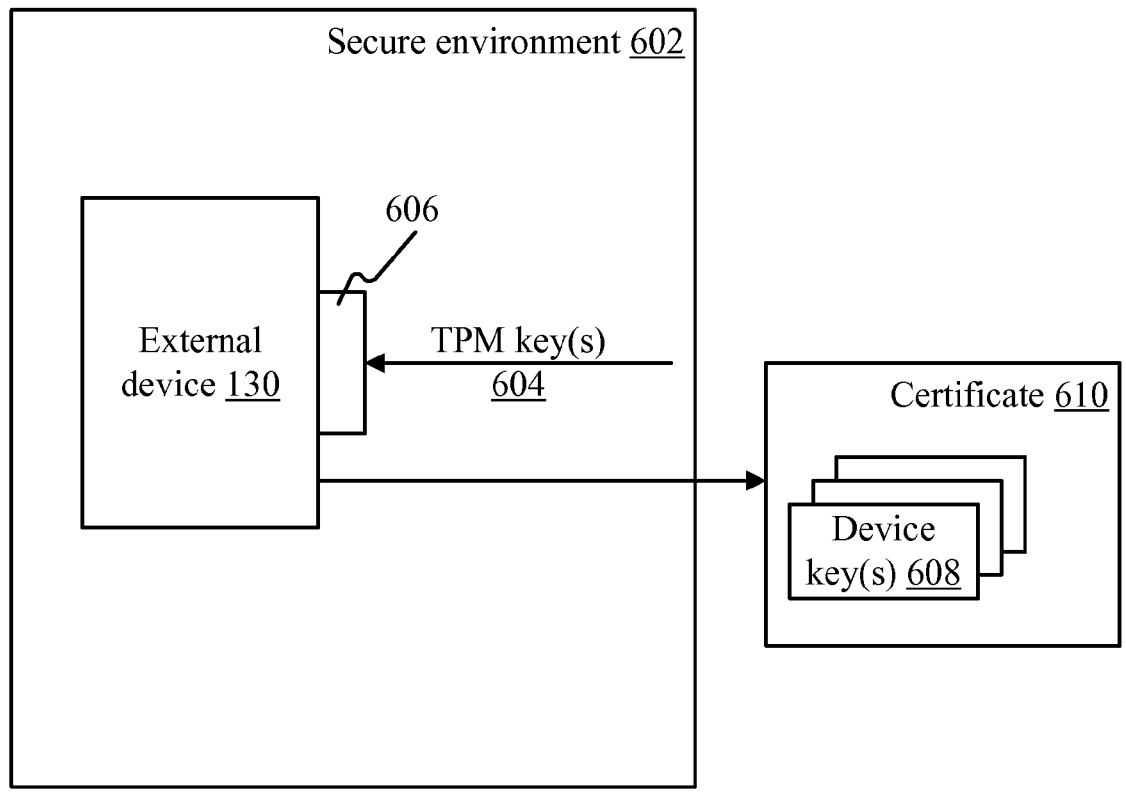
FIG. 6 is a block diagram of an example key-exchange scenario.

As noted above, there may be an out-of-band key-exchange process between an external device and its host machine. This process "marries" an external device to a particular machine, by allowing the device to identify the machine by a particular key and vice versa. FIG. 6 shows an example of how a key-exchange process may occur.

External device 130 may expose a function through which secret keys of a particular platform's TPM may be communicated to the device. The danger of exposing this function is that the keys of an untrustworthy or "bad" platform could be communicated to external device 130, thereby causing external device 130 to trust the bad platform. Thus, external device 130 is placed in a secure environment 602, such as a physically secure room in which external device 130 is cut off from data snooping. The security for secure environment 602 may lie in the fact that only a person trusted to communicate a "good" platform's keys to external device 130 is given access to external device 130 during the key-exchange process. However, the security of secure environment 602 could take any form.

Within secure environment 602, the key(s) 604 of a particular platform's TPM are provided to external device 130, through an interface 606 of that device. For example, the TPM's endorsement key may be provided to external device 130, although any key could be provided. In general, during normal operation of a TPM, the TPM may use keys stored within the TPM but does not disclose those keys to portions of its platform machine outside of the TPM itself. However, the keys could be made available under certain circumstances. For example, the person who is providing key(s) 604 to external device 130 may have learned the TPM keys from the TPM manufacturing process, or there may be a (very) secure "backdoor" through which the TPM can provide its keys under a limited and controlled set of circumstances. Once external device 130 learns of key(s) 604, it may store a representation of the key(s) (where the representation could be the key itself, or some data that represents the key).

In addition to the TPM keys that external device 130 receives, external device 130 may generate one or more device key(s) 608. A certificate 610 containing these keys may be created, which may be provided to the host machine with which external device 130 will communicate. For example, the host machine could receive the keys and then use the TPM's seal function to seal the keys to a particular platform execution state, and to a secret held by device proxy 312 (shown in FIG. 3). The keys may include the tunnel key that is used to encrypt data in cryptographic tunnel 314 (also shown in FIG. 3), or the tunnel key could be based on the key(s) contained in certificate 610, (or the tunnel key could be a key that is generated during a tunnel session and shared between the machine and the external device, using one of the keys contained in the certificate to protect the key during the sharing process.)

The subject matter described herein can be implemented as software that is stored in one or more data remembrance component(s) and that executes on one or more processor(s).

For example, software could be stored on one or more of data remembrance component 106 and 134, and could execute on one or more of processors 108 and 132 (shown in FIG. 1). As another example, the subject matter can be implemented as software having instructions to perform one or more acts of a method, where the instructions are stored on one or more computer-readable storage media (which are examples of data remembrance components). The instructions to perform the acts could be stored on one medium, or could be spread out across plural media, so that the instructions might appear collectively on the one or more computer-readable storage media, regardless of whether all of the instructions happen to be on the same medium.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A system to perform an operation, the system comprising:
    a device that comprises:
        a communication interface through which said device is communicatively connectable to a machine that comprises a first component that maintains a first key that said first component does not allow to be divulged outside of said first component, said first component having a barrier that surrounds said first component such that said first component does not allow said first key to be divulged outside of said barrier, data transmitted between said device and said machine through said communication interface being observable from outside of said first component;
        a first data remembrance component in which is stored (a) a representation of said first key, and (b) first software that is configured to perform the operation to generate first data and that is further configured to obtain, from said first component, an indication of said machine's execution state and to provide, or not to provide, said first data to said machine depending on one or more factors that include whether said machine's execution state satisfies one or more criteria; and
        a processor that is connected to said first data remembrance component and that executes said first software,
    said first data comprising a second key, an item stored by said machine being sealed to said machine's execution state and to said second key, said second key being stored on said device but not on said machine, said device implementing a counter that is incremented each time said device provides said second key to said machine, and said device verifying that said counter has not exceeded a limit as a condition to providing said second key to said machine.

2. The system of claim 1, further comprising:
    said machine, wherein said first component of said machine resets a record that said first component maintains of said machine's execution state whenever said machine is booted, and wherein said record is stored in elements that are extendible but are not settable to arbitrary values.

3. The system of claim 1, wherein said one or more factors further include whether said machine is in possession of either said first key or a particular second key.

4. The system of claim 1, further comprising:
    said machine, wherein said machine further comprises a second data remembrance component that stores a third key that is sealed to said machine's execution state and that is used to encrypt data sent between said machine and said device.

5. The system of claim 4, wherein said second data remembrance component stores second software that causes communication to occur between said machine and said device, and wherein said third key is further sealed to a secret maintained by said second software.

6. The system of claim 1, wherein said machine receives a certificate that comprises said first key, and wherein said machine verifies that said device holds said first key before transmitting data to said device.

7. The system of claim 1, wherein the operation comprises cryptography using a third key that said device does not divulge outside of said device, and wherein said first data is a result of performing the operation.

* * * * *